United States Patent [19]

Beers

[11] 3,837,878

[45] Sept. 24, 1974

[54] PROCESS FOR TREATING SILICA FILLERS

[75] Inventor: Melvin D. Beers, Ballston Lake, N.Y.

[73] Assignee: General Electric Company, Waterford, N.Y.

[22] Filed: Dec. 4, 1972

[21] Appl. No.: 311,486

[52] U.S. Cl............ 106/308 Q, 106/308 N, 106/309, 106/288 Q
[51] Int. Cl.......................... C08h 17/04, C09c 1/28
[58] Field of Search............ 106/308 N, 308 Q, 309, 106/288 Q

[56] References Cited
UNITED STATES PATENTS

| 3,290,165 | 12/1966 | Iannicelli | 106/308 N |
|---|---|---|---|
| 3,455,725 | 7/1969 | Jex et al. | 106/308 N |
| 3,635,743 | 1/1972 | Smith | 106/288 Q |
| 3,649,320 | 3/1972 | Yates | 106/287 |

*Primary Examiner*—Delbert E. Gantz
*Assistant Examiner*—J. V. Howard
*Attorney, Agent, or Firm*—Donald J. Voss; E. Philip Koltos; Frank L. Neuhauser

[57] ABSTRACT

A process for treating silica fillers comprising contacting the silica filler with a mixture of a hydroxyl amine, a cyclic siloxane and silyl nitrogen compound. These additives are added to the silica simultaneously and allowed to come in contact with the silica filler at a temperature in the range of 100° to 180°C. The remaining amounts of the additives are removed through vacuum devolatilization after the treatment. A filler treated in this manner has a large number of organosiloxy groups appended to it.

11 Claims, No Drawings

PROCESS FOR TREATING SILICA FILLERS

BACKGROUND OF THE INVENTION

This invention relates to the treatment of silica fillers and more particularly to the treatment of silica fillers wherein said fillers are simultaneously brought into contact with three additives comprising a hydroxyl amine, a cyclic siloxane and a silyl nitrogen compound.

In the past there have been many attempts to treat silica fillers, that is, silica fillers as obtained from silica filler manufacturers. Fumed silica or precipitated silica as obtained from the manufacturers are found to contain a certain amount of free hydroxyl groups or absorbed water of anywhere from 0.1 to 5 percent by weight or more. It was found that when silicone rubber compositions were produced either heat curable silicone rubber compositions or room temperature vulcanizable silicone rubber compositions using the heretofore mentioned fillers, the resulting cured elastomeric materials would have poor physical properties. In addition, it was also found in the case of heat curable silicone rubber that with the use of untreated filler in it, that is, filler having the free hydroxyl groups mentioned previously, the uncured rubber would structure upon standing and might even come to the point of crumbling and coming apart. In the case of room temperature vulcanizable silicone rubber, if the silicone rubber composition with the untreated silica filler in it did not structure or harden, nevertheless, it was found that such compositions had poor physical properties in terms of tensile strength, elongation, tear and etc. It was postulated that the reason for these poor physical properties was that the free hydroxyl groups in the untreated filler would react with the other ingredients in the silicone rubber or interact with themselves to yield a structured composition. Even when the composition was cured such free hydroxyl groups would result in the rubber product having low strength characteristics and a general lack of desirable physical properties. Accordingly, it was early decided to experiment with treating the fillers so as to tie up or remove the free hydroxyl groups.

One method that was tried early in this investigation was the heating of the filler to excessively high temperatures, that is, in excess of 200°C and above so as to remove all the hydroxyl groups from the filler. It was found that when this was done the filler tended to clump together such that it no longer was in the state of a free flowing powder. It was also found that when such a filler was cooled to room temperature that it was very hygroscopic and would readily absorb moisture from the atmosphere. Accordingly, it was very hard to process such a filler.

Then, as disclosed in Lucas, U.S. Pat. No. 2,938,009, it was found that fillers could be treated with cyclic siloxanes. During the treating process, these cyclic siloxanes would fracture and append themselves to the free hydroxyl groups in such a manner that the free hydroxyl groups in the silica filler lost their capacity to react. Accordingly, it was found that fillers treated in accordance with the Lucas method resulted in silicone rubber compositions that had less tendency to structure. It was also found that such treated fillers had a better shelf stability and resulted in silicone rubber compositions of higher physical properties. However, it was found that even with the method of Lucas only a portion of the free hydroxyl groups were tied up or eliminated by the Lucas treatment.

Accordingly, other investigators carried out further research in this area as disclosed in Brown, U.S. Pat. No. 3,024,126, which discusses treating the filler simultaneously with a silicone compound containing in it alkoxy-hydroxy groups in combination with any of a series of amine compounds. However, it was still found that with this treatment of Brown the resulting treated silica filler, even though it had improved shelf stability and imparted desirable physical properties to the silicone rubber composition, it still resulted in a silica filler that had a substantial amount of free hydroxyl groups which had not been tied up or eliminated by the treatment procedure.

An improvement over the Brown patent is to be found in the patent of Smith, U.S. Pat. No. 3,635,743. This patent dictated the treatment of the filler with ammonia or ammonia derivative as a pretreatment and then subsequently treating with various types of silicone compounds. It was also disclosed and particularly in Column 2, lines 10 and on of the patent, that before or after the treatment with the ammonia or ammonia derivative the filler could also be treated with an alkyl cyclic polysiloxane. This disclosure particularly is pertinent in that it is disclosed that the treating additives had to be applied or come into contact with the filler separately and independently in a particular sequence, that is, first the filler was to be treated separately and independently with an ammonia derivative or an amine compound, whereupon subsequently it could optionally be treated with an alkyl cyclic polysiloxane and then treated with a sil-nitrogen compound. What is disclosed to be critical in this disclosure is that the filler had to first be treated independently and separately with the ammonia or ammonia derivative compounds. Then in a second and subsequent step, the filler was then treated with a silicone compound one of which type may be a silazane. It was disclosed in this patent that in order to obtain the benefits and advantages of the invention, the treatment steps had to be separate and independent. The filler that was treated in accordance with the process of Smith was advantageous in that it would result in the larger percentage than had been heretofore attained of the free hydroxyl groups in the silica filler being tied up or substituted by triorganosiloxy groups such that the filler was very well treated. When such a filler was incorporated into silicone rubber compositions, it resulted in a cured composition of enhanced physical properties. Thus, for some purposes to which the silicone rubber compositions could be utilized, it was found that even with the filler of Smith that the silicone rubber composition did not have the desired physical properties, that is, such compositions did not have a sufficient shelf life and had undesirable high viscosities in the uncured state.

It is one object of the present invention to provide a silica filler which is treaated so well that when incorporated into various silicone rubber compositions it results in such silicone rubber compositions having enhanced shelf life, desirable low viscosities and improved physical properties in the cured state.

It is another object of the present invention to provide a process for treating a silica filler which process is economical and efficient and results in the substitution of most of the free hydroxyl groups in said silica filler with triorganosiloxy groups or diorganosiloxy groups thus making the filler completely hydrophobic after the treatment process.

It is an additional object of the present invention to provide a process for treating silica fillers which is very rapid and efficient and which product of such process results in a filler with exceptional properties in that it is not very reactive but adds enhanced physical properties into the silicone rubber compositions into which it is incorporated.

Thus, these and other objects of the present invention are accomplished by means of the invention set forth below.

SUMMARY OF THE INVENTION

There is provided in accordance with the above objects a process for treating the silica filler comprising (a) intimately contacting per 100 parts of a silica filler having a surface area of at least 50 square meters per gram and containing from 0.2 to 2 percent by weight of moieties selected from the group consisting of hydroxyl groups and water and mixtures thereof with (i) from one-half parts to 5 parts of a hydroxyl amine having the formula, $$R^1-\underset{\underset{R^2}{|}}{N}OH \tag{1}$$

ii. from 2 to 25 parts of a cyclicsiloxane of the formula, $$(R_2^3 \, SiO)_3, \text{ and} \tag{2}$$

iii. from 1 to 20 parts of a silazane of the formula, $$(R_3^4 \, Si)_a \, X \tag{3}$$

wherein the above additives are simultaneously mixed and contacted with said filler at a temperature in the range of 100° to 180°C, (b) after the contacting period the residual amount of said additives are removed from the filler, wherein $R^1$ is selected from the class consisting of monovalent hydrocarbon radicals, halogenated monovalent hydrocarbon radicals, $R^2$, $R^3$ and $R^4$ are all selected from the class consisting of hydrogen, monovalent hydrocarbon radicals and halogenated monovalent hydrocarbon radicals, a is a whole number that varies from 1 to 2, X is selected from the class consisting of $-NR^5Y$, $-ONR_2^5$ and $$-\underset{\underset{|}{N}-}{\overset{Y}{|}},$$

where $R^5$ is selected from monovalent hydrocarbon radicals and halogenated monovalent hydrocarbon radicals and Y is selected from hydrogen and $R^5$.

It should be noted that in the compound of formula 2, only 33 mole percent of the $R^3$ moieties or radicals may be hydrogen and the rest of the $R^3$ radicals may be selected from organic radicals and preferably all of the $R^3$ radicals are organic radicals. In addition, in the compounds of formula (3), at a maximum only 33 mole percent of the $R_4$ radicals are selected from hydrogen and most preferably all of the $R^4$ radicals are organo radicals, preferably alkyl radicals. It is a critical part of the present invention that the three additives disclosed as the hydroxyl amine, the cyclicsiloxane and the silyl nitrogen compound are used together or come in contact and treat the filler simultaneously. Such treatment process is preferably carried out for from 3 to 8 hours, although a shorter or longer time may be used. The broad range indicated for the treatment process is the general time range and most preferably only 3 to 5 hours of treatment time is used. Preferably, the hydroxyl amine is diethyl hydroxyl amine; the cyclicsiloxane is hexamethylcyclotrisiloxane and the silazane is hexamethyldisilazane.

In place of the trimer of formula 2, there may be used a tetramer, that is, a compound of the formula, $$(R_2^3 \, SiO)_4 \tag{4}$$

The compound of formula 4 is a cyclotetrasiloxane which is commonly known as a tetramer to a worker skilled in the art. Although the tetramer of formula 4 may be used in the process of the present invention, it is not the most preferred. The cyclotrisiloxane of formula 2 is the preferred cyclicsiloxane treating additive of the present invention. Other cyclicsiloxanes are not useful in the invention of the present case, that is, although they can be used in the process of the present invention, they do not result in a filler that is treated in an exceptional manner in accordance with the present invention but result in a filler treated below the standards of the present invention.

As has been stated, the critical part of the present invention is that the silica filler is simultaneously contacted with three additives, that is, the hydroxyl amine, the cyclicsiloxane and the sil-nitrogen compound. The reason for this is that for some reason which is not understood, the use of all three compounds together results in a catalytic effect such that the triorganosiloxy groups of the compound of formula 3 and the diorganosiloxy groups of the compounds of formula 2 or formula 4 are very reactive and substitute themselves readily and in a comprehensive manner either to append themselves to the free hydroxyl groups in the silica or to tie up the said free hydroxyl groups. It is postulated that in the process of the present case the hydroxyl amine acts as a catalyst for the silicon nitrogen compound so as to activate the sil-nitrogen compound to a very high reactivity so that the triorganosiloxy groups will readily substitute themselves or tie up the free hydroxyl groups in the silica. But unexpectedly it has been found that all the sil-nitrogen compound when used in combination with the other ingredients catalyzes the cyclicsiloxane to diorganosiloxy units which diorganosiloxy units become very reactive under this catalytic effect and substitute themselves or tie up in a comprehensive manner most of the remaining free hydroxyl groups in the silica filler which the sil-nitrogen units do not reach. It should be obvious that there is a coreaction here with three different types of ingredients which is not well understood and that the above is merely a hypothesis. For instance, the mere use of the hydroxyl amine and the sil-nitrogen compound alone will not result in a filler that is treated as well as the fillers of the present invention. Also, the use of the hydroxyl amine with the cyclicsiloxane together will not result in a filler treated as well as the filler of the present invention. It is the discovery of this invention that the combination of these three additives in the proportions set forth above result in a composition which has a very reactive diorganosiloxy unit of the cyclicsiloxanes of formula 2 and the triorganosiloxy units of the sil-nitrogen compounds of formula 3, such that they readily and comprehensively substitute themselves or tie up the free hydroxyl groups in the silica filler so as to result in a silica filler which is not hygroscopic and which when incorporated into silicone rubber compositions, either heat cured silicone rubber compositions or room temperature vulcanizable silicone rubber compositions, results in such compositions having long shelf stability, low viscosities and enhanced physical properties in the cured state.

DESCRIPTION OF THE PREFERRED EMBODIMENT

The $R^2$ radical, the $R^3$ radical and the $R^4$ radical are preferably selected from hydrogen, monovalent hydrocarbon radicals and halogenated monovalent hydrocarbon radicals and mixtures thereof. Thus, the $R^2$ radical, the $R^3$ radical and the $R^4$ radical may be individually selected from the group consisting of mononuclear and binuclear aryl radicals such as, phenyl, tolyl, xylyl, naphthyl, and etc.; halogenated mononuclear and binuclear aryl radicals such as, chlorophenyl, chloronaphthyl and etc.; mononuclear aryl lower alkyl radicals having from one to eight carbon atoms per alkyl group such as, benzyl, phenyl, ethyl and etc.; lower alkyl radicals having from one to eight carbon atoms such as, methyl, ethyl, propyl, butyl, pentyl, hexyl, octyl and etc.; lower alkenyl radicals having from two to eight carbon atoms, such as, vinyl, allyl, 1-propenyl; halo lower alkyl radicals having from one to eight carbon atoms such as, chloropropyl, trifluoropropyl and cycloalkyl radicals such as, cyclobutyl, cyclopentyl, cyclohexyl.

The $R^1$ radical may be selected from any of the above monovalent hydrocarbon radicals and halogenated monovalent hydrocarbon radicals but may not be hydrogen. In addition, any of these radicals, the $R^1, R^2, R^3$ and $R^4$ radicals may be a mixture of any of the above ennumerated organic substituent groups in the compounds of formulas 1, 2 and 3.

With respect to the compounds of formulas 2, 3 and 4, only up to 33 percent of the organic substituent groups in the molecule may be hydrogen, the rest of the radicals in the molecule have to be selected from the above ennumerated monovalent hydrocarbon radicals and halogenated monovalent hydrocarbon radicals. Preferably, the radicals $R^2$, $R^3$ and $R^4$ are all selected from the above ennumerated monovalent hydrocarbon radicals and halogenated monovalent hydrocarbon radicals. Most preferably, $R^1$, $R^2$, $R^3$ and $R^4$ in formulas 1, 2, 3 and 4 are selected from lower alkyl radicals having one to eight carbon atoms such as, methyl, ethyl and mononuclear aryl radicals such as, phenyl. The most preferred substituent group for $R^1$, $R^2$, $R^3$ and $R^4$ are lower alkyl radicals of one to eight carbon atoms. However, in the broad generic aspect of the invention, the compounds of formulas 1, 2, 3 and 4 may have any of the substituent monovalent hydrocarbon radicals and halogenated monovalent hydrocarbon radicals ennumerated previously.

The hydroxyl amine of formula 1 are well known compounds and are manufactured by companies such as Pennwalt, Inc. This compound as noted must have a hydroxyl group appended to the nitrogen of the other organic substituent groups that are attached to the nitrogen. One of them may be hydrogen, however, preferably, both are monovalent hydrocarbon radicals or halogenated monovalent hydrocarbon radicals.

The cyclicsiloxanes of formula 2 are also well known materials, that is, produced and manufactured by silicone manufacturers, for instance, see Lucas, U.S. Pat. No. 2,938,009.

The cyclotetrasiloxane of formula 4 are well known compounds which are identified in the previous patent as well as their method of preparation.

Briefly, both types of cyclicsiloxanes are produced by hydrolyzing hydrocarbon substituted chlorosilanes and the resulting hydrolyzate is cracked or thermally distilled at an elevated temperature in the presence of a catalyst such as potassium hydroxide so as to remove off and distill off the cyclicpolysiloxanes. The cyclicpolysiloxanes that are produced by such a thermal cracking procedure are mostly cyclotrisiloxane of formula 2 and tetracyclicsiloxanes of formula 4. These different types of cyclicsiloxanes can be separated again by distillation and other well known separation procedures. The preferred cyclicsiloxane reactant in the present case is the cyclotrisiloxane of formula 2, since that has the greatest reactivity in the present process and will result in the largest amount of substitution of the diorganosiloxy groups onto the free hydroxyl groups in the silica. Although, the cyclotetrasiloxane of formula 4 is less preferably acceptable in the process of the present invention, as a result it has less reactivity as many diorganosiloxy groups or hydrogen organosiloxy groups append themselves to the hydroxyl groups in the silica as is the case when the cyclotrisiloxane of formula 2 is used in the process. Thus, even though the cyclotetrasiloxane will produce in the process of the present invention a treated filler which may be suitable for many silicone rubber products, nevertheless, in the most preferred type of treated filler to produce silicone rubber compositions which when cured have outstanding physical properties, the cyclotrisiloxane of formula 2 is utilized in the process of the present invention. The other ingredient in the process of the present invention is the sil-nitrogen compound of formula 3. As stated previously, only up to 33 mole percent of the $R^4$ radicals in any molecule may be hydrogen atoms, the rest have to be selected from the above recited monovalent hydrocarbon radicals and halogenated monovalent hydrocarbon radicals. preferably, all the $R^4$ radicals are monovalent hydrocarbon radicals and halogenated monovalent hydrocarbon radicals such as, lower alkyl radicals having from one to eight carbon atoms.

As indicated above, the compound of formula (3) may be a silazane, an aminoxy silicone compound or a silicone amine compound. In the most preferred embodiment, it is a silazane compound, and the value of a is 2. Thus, in the most preferred embodiment of the present invention, X is

Again, although the aminoxy compound within the scope of formula 3 and the amine compound within the scope of formula 3 may be used in the process of the present invention, when such compounds are used there is not utilized the most preferred treatment procedure. It was found that the most reactive type of additive that could be used in the process of the present invention is a silazane. When the aminoxy compounds and the amine compounds within the scope of formula 3 are used in the process of the present invention a treated filler will be obtained which is suitable for many uses by being incorporated into various uncured silicone rubber compositions for producing certain silicone rubber products. The most preferred treated filler, that is, the one which imparts to the resulting product the most advantageous properties and the most outstanding physical properties, is obtained when there is utilized in the reaction of the present invention a silazane within the scope of the compound of formula 3, that is, when X is selected from

The most preferred of the treating additives as set forth above and particularly within the scope of formula 1 is diethylhydroxyl amine. The most preferred compound within the scope of formula 2 is hexamethylcyclictrisiloxane and the most preferred compound within the scope of the compound of formula 3 is hexamethyldisilazane.

The hydroxyl amine treating additive is preferably utilized at a concentration of one-half parts to 5 parts based on 100 parts of the silica filler. A lower amount than one-half part does not result in a desirable catalyzing effect on the other treating agents and a larger amount than 5 parts has been found not to be useful. The most preferred amount for this hydroxyl amine treating agent has been found to be 2 to 3 parts based on 100 parts of silica filler. The cyclicsiloxane whether it is the cyclicsiloxane of formula 2 or formula 4 is generally used at a concentration of 2 to 25 parts based on 100 parts of the silica filler. All parts as set forth above and as set forth in the examples are by weight. It has been found that less than 2 parts of the cyclicsiloxane does not result in proper treatment of the filler, that is, sufficient amount of diorganosiloxy groups are not appended or substituted onto the hydroxyl groups in the silica filler. Above 25 parts of the cyclicsiloxane was found not to result in any noticeable enhancement in the treatment of the filler. Preferably, the cyclicsiloxanes are utilized in the process of the present invention at a concentration of 5 to 14 parts and most preferably 8 or 9 parts per 100 parts of the silica filler.

The sil-nitrogen compound broadly is preferably used at a concentration of 1 to 20 parts based on 100 parts of the silica filler. The use of the sil-nitrogen compound at a concentration of less than 1 part has not been found to enhance or result in an acceptably treated filler. The use of the sil-nitrogen compound in excess of 20 parts has been found not to result in an enhanced treated filler due to the added sil-nitrogen compound. Most preferably, the sil-nitrogen compound is utilized in the process of the present invention at a concentration of 7 to 15 parts and most preferably from 12 to 13 parts. In the most preferred compounds within the scope of formula 3, when X is equal to

preferably, Y is selected from hydrogen or a lower alkyl radical such as, methyl. It should also be mentioned that the sil-nitrogen compounds of formula 3 are well known compounds which have been known to silicone manufacturers and, for instance, are exemplified in the disclosure of U.S. Pat. No. 3,635,743.

The process of the present invention can be used to advantageously treat any type of silica filler and most preferably fumed silica or precipitated silica or a mixture of these two types of fillers. Thus, the process of the present invention can be utilized to treat a filler mixture comprising 5 to 95 percent by weight of a fumed silica having a surface area of 50 to 500 square meters per gram and 5 to 95 percent by weight of a precipitated silica filler having a surface area of 100 to 500 square meters per gram. Although the above mixture of fumed silica to precipitated silica filler is the most preferred mixture for certain silicone rubber compositions, it is understood that the fillers that could be treated with the process of the present invention can comprise precipitated silica filler alone or fumed silica alone or any mixture of these two silica fillers or other types of silica fillers. Preferably, these silica fillers that are utilized in the process of the present invention have a surface area that may vary anywhere from at least 50 square meters per gram or higher. The fumed silica which is a pyrogenic silica filler or the precipitated silica may be made by any of various procedures well known in the art and may be treated by the process of the present case.

Another necessary aspect for the process of the present invention to operate is that there must be a certain amount of free hydroxyl groups and absorbed water in the silica filler of mixture of fillers. Thus, generally there must be at least 0.02 percent by weight of free hydroxyl groups in the filler. It is necessary that there be at least this small amount of free hydroxyl groups in the silica filler in order for the filler to have the proper properties, that is, to be in the form of free flowing powder, and such that the various treating additives which are utilized in the process of the present invention can operate. On the other hand, generally there should be no more than 2 percent by weight of water based on the weight of the filler or the mixture of fillers. If there is more than this amount of water in the filler then the free hydroxyl groups and absorbed water in the filler will deleteriously effect the reaction and the reactivity of the sil-nitrogen compound in its reaction in which it is appended to the free hydroxyl groups on the silica particles. Most preferably in the process of the present invention, the silica filler contains from 0.04 to 0.08% by weight of hydroxyl groups and absorbed water. It has been found that the filler is best treated when the hydroxyl content including the absorbed water content in the silica filler varies from 0.04 to 0.08 percent by weight based on the weight of the silica filler to be treated. With this amount of hydroxyl groups in the filler, the filler is in the form of a free flowing powder and it has been found that the various treating agents have the highest reactivity and react with or substitute in the most efficient manner with the hydroxyl groups in the filler. If there is too little water in the filler, that is, the manner in which it is received from the manufacturer of filler such as, CabOsil Corporation, water can be added to the filler in a small amount. In addition, if it is found that the filler has too much amount of water in it then the water can be rremoved by a heating procedure while at the same time passing a stream of inert gas such as, nitrogen or some such inert gas over the heated filler particles.

The critical part of the present invention is that the silica filler or mixture of fillers having the above defined surface area and hydroxyl content is contacted simultaneously with the proper concentrations of the hydroxyl amine, cyclicsiloxane and silyl nitrogen compound. It has been found that all three ingredients, that is, the hydroxyl amines, cyclicsiloxanes and the silyl nitrogen compound, must be used simultaneously and at the same time to treat the filler. If one agent such as the hydroxyl amine is used first and the other two agents are used in a second step to treat the filler, then it has been found that the filler is not treated as well. Thus, it has been found that the process set forth in U.S. Pat. No. 3,635,743, while resulting in a filler which was treated in a better fashion than was known prior to the filling of that patent that such a treatment was superseded by the treatment procedure of the disclosure of the present invention. The best treated filler is obtained not when the hydroxyl amine is used first to treat the filler; then the cyclic siloxane is used to treat the filler in a separate independent step and then finally the silyl nitrogen compound is utilized in a separate and independent step to treat the filler. Thus, it was found that the best treated filler up to the present time and up to the filing of the present application is obtained when the hydroxyl amine, the cyclicsiloxanes and the silyl nitrogen compound are used simultaneously to treat the filler at the same time. The removal of any of these three ingredients from these treatment steps results in an inferior treated filler to the filler of the present invention. In addition, the utilization of any of these three ingredients in a treatment step and then treating the filler with the remaining ingredients in a subsequent treatment step results in a filler which is treated inferior to the filler of the present invention. Accordingly, the process of the present invention is critical in the simultaneous treatment of the silica filler with the treatment additive ingredients of formulas 1, 2 and 3.

Preferably, the treatment process is carried out at a temperature of 100° to 180°C for 1 to 8 hours, while the filler is constantly being agitated. Of course, the agitation is not a necessity in the process of the present invention, but it is preferred. The more preferred reaction temperature for the treatment of the filler with the above treating ingredients is a temperature in the range of 135° to 180°C. Of course, it must be understood the kettle in which the treatment procedure is to be carried out should be sealed properly. Thus, there still will be some pressure developed in the treatment in the kettle. Of course, excess amounts of the treating ingredients can be used and the reaction can be carried out at substantially atmospheric pressure while the kettle is sealed but vented occasionally to let off excess gases. However, this procedure is not preferred since it results in the waste of material. In addition, the reaction may be carried out at excessive pressures so as to enhance or speed up the reaction time. Thus, preferably, the reaction is carried out in a pressure vessel that is maintained at a pressure of 10 to 100 psig. In the most preferred temperature range of the reaction of the present invention, it is preferred to carry out the process of the present invention at a temperature in the range of 145° to 155°C, wherein the filler is treated with the three ingredients of formulas 1, 2 and 3, in a time of 3 to 5 hours with agitation. Samples of the filler may be removed from the catalyst during the process and the filler tested in the aminoxy structure test which will be identified below. When the proper flow properties are obtained in the aminoxy structure test then the treatment procedure can be terminated. However, if it is desired not to follow the reaction periodically as it proceeds, the reactants can be allowed to react intimately with the filler for the full period of 8 hours or more and at that time, of course, the filler will be treated well enough to pass any criterian in the aminoxy structure test that may be desired. After the treatment period has been terminated, the kettle is opened and the remaining amount of additives that may be present in the kettle are stripped off by heating the kettle to a temperature in the range of 150° to 200°C and more preferably at a temperature of 185° to 200°C. It is desirable in this stripping procedure to remove all the nitrogen compounds from the filler, that is, the hydroxyl amine of formula 1 and the silyl nitrogen compound of formula 3. At the end of the stripping procedure, the filler is tested by an acid tritration and the stripping is discontinued when it is found that there is 2 parts per million of nitrogen in the filler. If there is more nitrogen present in the form of a silicon nigrogen compound in the filler, then this nitrogen whether in the form of silicon compound or not will undesirably effect the properties of the silicon rubber composition into which the filler is incorporated. More particularly, it will give an undesirable color to the silicone rubber composition into which the filler may be incorporated.

A typical process within the scope of the present invention involves taking a mixture of fillers and testing such fillers for their water content. If water needs to be added to the filler to come within the above preferred range, either broad or preferred, then water is added and the kettle and filler in it are heated while agitating the filler to a temperature of 100° to 110°C. Of course, if the filler has too much water in it, such excess water can be stripped off at this temperature by simply passing an inert gas stream through the kettle. At that point of 110°C, the solution of the three treating agents within the above concentrations is added in the kettle and the kettle is sealed. Then the kettle is heated up to 145° to 155°C whereupon the pressure of the vessel increases from 20 psig to about 50 psig and the kettle is maintained at this temperature for a period of 3 to 5 hours. Throughout this period, it is preferred that the silica filler be agitated. At the end of that period or intermittently after the first two hours of treatment, samples of the filler are removed and the filler tested in the aminoxy structure test. When it is found in such an aminoxy structure test that the flow is 4 inches in less than 35 seconds, then this determination shows that the filler is treated in the best manner possible and the treatment procedure can be stopped. Of course, as can be envisioned, it may be desired not to treat the filler to the maximum possible point and by periodically making the aminoxy structure test the reaction can be stopped when the filler has been treated to the point that is desired.

After the treated filler has passed the aminoxy structure test then the kettle is opened and the contents are heated to a temperature preferably of 185°C whereupon all the excess treating agents are removed from the filler. The filler is then tested for nitrogen content and if it passes the nitrogen content test it is now ready for use as a superior additive to various types of silicone rubber compositions. It has been found that fillers when treated in accordance with the process of the present invention and when incorporated into room temperature vulcanizable silicone rubber compositions, that such room temperature vulcanizable silicone rubber compositions will have a shelf life of as much as 2 years as compared to 3 to 4 weeks or up to 4 months with fillers treated with prior methods. In addition, it will be found that such a filler treated in accordance with the process of the present invention when incorporated into low viscosity silanol material will not disadvantageously increase the viscosity of the silanol-stopped polysiloxane and in addition the resulting composition has desirable flow properties and impression making properties. In addition, such a filler can be utilized in the silicone rubber composition in large amounts and when utilized in a silicone rubber composition will give the cured silicone rubber composition enhanced physical properties such as, tensile strength, elongation and tear. In addition, it will be found that a filler treated in accordance with the process of the present invention does not cross-link with catalysts and the common cross-linking agents that might be found in room temperature silicone rubber compositions or heat curable silicone rubber compositions. In addition, the low viscosity of such silicone rubber compositions allows them to be handled easily and such compositions need not be handled specially in order to remove air bubbles from the mixture prior to cure.

Utilizing the process of the present invention, there is obtained the uniquely treated filler, that is, a filler having 4 percent to 20 percent by weight of the filler of chemically combined hydrogen diorganosiloxy units or triorganosiloxy units of the formula, $$R_3^4 Si—$$

and 2 to 10 percent by weight of chemically combined hydrogen organosiloxy units or diorganosiloxy units of the formula, $$R_2^3 Si—$$

where $R^4$ and $R^3$ are as defined previously.

The treated fillers of the present invention were tested in comparison with fillers treated in accordance with the prior art by using the aminoxy structure test. In this test, the treated filler is mixed with a silanol-stopped dimethylpolysiloxane oil having a viscosity of 2,500 to 3,500 centipoise at 25°C, into which is incorporated aminoxy curing agents such as, 1,3,5,7,7-pentamethyl-1,3,5-tris(diethylaminoxy)cyclotetrasiloxane and 1,3,5,5,7,7-hexamethyl-1,3-bis(diethylaminoxy)cyclotetrasiloxane, where there is used 16 parts of the latter curing agent to 1 part of the former curing agent. This aminoxy curing agent is a very rapid curing agent which starts to cure the silanol-stopped dimethylpolysiloxane almost immediately. To 16 parts of the silanol-stopped dimethylpolysiloxane oil there is added 0.05 parts of the aminoxy curing agent and 2.5 parts of the filler treated in whatever manner. These ingredients are then mixed together by hand for 1 to 2 minutes and then a portion of the mixture is placed on a Boeing flow jig which measures the flow properties of the mixture, that is, in the Boeing flow jig the mixture is placed in the bowl and then the horizontal test jig is taken and placed on one end so that the polysiloxane can flow vertically downward from the bowl on a scale. The amount of flow downward due to the force of gravity after 35 seconds is measured in inches of flow. This aminoxy structure test is also the one that was referred to previously in the above discussion.

The following examples are given for the purpose of illustrating and exemplifying the present invention and it is not intended by the presentation of these examples to limit the invention in any way or manner. All parts in the examples are by weight, unless stated otherwise.

EXAMPLE 1

There was taken 90 parts of a fumed silica having a surface of 200 square meters per gram and 10 parts of precipitated silica having a surface area of 275 square meters per gram with a total moisture content adjusted to 0.5 to 1.0 percent by weight. This mixture is heated to 145°–170°C and then a solution consisting of 2 parts of diethylhydroxylamine, 12 parts of hexamethyldisilazane and 8 parts of hexamethylcyclotrisiloxane are added and heated for 6 hours under sealed conditions. Then the material is devolatilized at a temperature of 160°C at a nitrogen content level of less than 50 ppm. After this, a sample of the treated filler is treated in the aminoxy structure test and is found to flow 4 inches in 15 seconds on a Boeing test jig.

EXAMPLE 2

There was taken 90 parts of fumed silica having a surface area of 200 square meters per gram and was heated to 250°–270°C at which time 18 parts of hexamethylcyclotrisiloxane was added. The mixture was cooked for 3 hours. Then the filler is devolatilized. The batch is cooled to 145°–170°C at which time there was added 10 parts of a precipitated silica having a surface area of approximately 275 square meters per gram and the total mixture has a total moisture content of 0.5 to 1.0 weight percent. To this mixture there was added 20 parts of hexamethyldisilazane and 2 parts of diethylhydroxylamine. The mixture is cooked for 6 hours at 140°–170°C in a sealed vessel. After this period of time, the mixture is devolatilized to a nitrogen content of less than 50 ppm. This treated filler was tested in the aminoxy structure test and was found to give a flow of 1.04 inches in 120 seconds.

EXAMPLE 3

There was taken 90 parts of fumed silica having a surface area of approximately 200 square meters per gram and 10 parts of a precipitated silica having a surface of approximately 275 square meters per gram with a total adjusted moisture content of 0.5 to 1.0 percent by weight. The mixture is heated to 145°–170°C. To this mixture there was added 2 parts of diethylhydroxylamine and the mixture was cooked for 6 hours in a sealed kettle. Then it is devolatilized to total nitrogen content of less than 50 ppm. Then there was added 8 parts of hexamethylcyclotri siloxane and heated 145° to 170°C for 6 hours. Then the mixture is devolatilized. Then at a temperature of 145° to 170°C, there is added to the filler mixture 12 parts of hexamethyldisilazane and cooked for 6 hours in a sealed vessel. Then the filler is devolatilized to a total nitrogen content of less than 50 ppm. The resulting product was then tested in the aminoxy structure test and found to flow 4 inches in 180 seconds.

EXAMPLE 4

There was taken 90 parts of fumed silica with a surface area of 200 square meters per gram and mixed with 10 parts of a precipitated silica having a surface area of 275 square meters per gram with the total moisture content of the mixture being from 0.5 to 1.0 percent by weight. The mixture is heated to 145° to 170°C and there is added 2 parts of diethylhydroxylamine and the batch is then worked for 6 hours. Then the filler is devolatilized to a total nitrogen content of less than 50 ppm. Then a solution of 8 parts of hexamethylcyclotrisiloxane and 12 parts of hexamethyldisilazane are added and the mixture cooked in a sealed vessel for 6 hours at 145°–170°C. At the end of that time, the filler is devolatilized to less than 50 ppm of total nitrogen. The filler as prepared is tested in the aminoxy structure test and found to have a flow of 4 inches in 168 seconds.

EXAMPLE 5

There was taken 90 parts of a fumed silica having a surface area of approximately 200 square meters per gram and 10 parts of precipitated silica having a surface area of 275 square meters per gram with the total reaction content adjusted to 0.5 to 1.0 percent by weight. The filler mixture was heated to 145°–170°C and there was added to it 2 parts of diethylhydroxylamine and 8 parts of hexamethylcyclotrisiloxane. The resulting mixture was heated in a sealed vessel for 6 hours at 145°–170°C. Then the filler was devolatilized to a nitrogen level of less than 50 ppm. Then there was added to the filler mixture 12 parts of hexamethyldisilazane and the mixture was worked for 6 hours at 145°–170°C. After that time, the filler was devolatilized to a total nitrogen content of less than 50 ppm and tested in the aminoxy structure test where the flow was 4 inches in 31 seconds.

I claim:

1. A process for treating a silica filler comprising (a) intimately contacting 100 parts of a silica filler having a surface area of at least 20 square meters per gram and containing from 0.2 to 2.0 percent by weight of moieties selected from the class consisting of hydroxyl groups, water and mixtures thereof with (i) from one-half part to 5 parts of a hydroxyl amine having the formula,

$$R^1\text{—}\overset{R^2}{\underset{}{N}}\text{OH}$$

ii. from 2 to 25 parts of a cyclicsiloxane of the formula,

$(R_2^3 \text{SiO})_3$, and iii. from 1 to 20 parts of a sil-nitrogen compound of the formula,

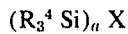

$(R_3^4 \text{Si})_a \text{X}$ wherein the above additives are simultaneously contacted with said filler at a temperature in the range of 100° to 180°C, and (b) removing residual amounts of said additives from the filler, where $R^1$ is selected from the class consisting of monovalent hydrocarbon radicals and halogenated monovalent hydrocarbon radicals, $R^2$, $R^3$ and $R^4$ are all selected from the class consisting of hydrogen, monovalent hydrogen radicals and halogentated monovalent hydrocarbon radicals where at a maximum only 33 mole percent of the $R^3$ and $R^4$ radicals may be hydrogen, a is a whole number that varies from 1 to 2, X is selected from the class consisting of $-NR^5Y$, $-ONR_2^5$ and

$$-\overset{Y}{\underset{}{N}}-,$$

where $R^5$ is selected from monovalent hydrocarbon radicals and halogenated monovalent hydrocarbon radicals and Y is selected from hydrogen and $R^5$.

2. The process of claim 1 wherein the contacting of the filler with the additives is carried out for 3 to 8 hours.

3. The process of claim 1 wherein $R^1$ and $R^2$ are alkyl.

4. The process of claim 1 wherein the hydroxyl amine is diethylhydroxylamine.

5. The process of claim 3 wherein $R^3$ is alkyl.

6. The process of claim 5 wherein $R^4$ is alkyl, X is

$$-\overset{Y}{\underset{}{N}}-,$$

a is 2 and Y is hydrogen.

7. The process of claim 1 wherein the hydroxyl amine is present at a concentration of 1 to 3 parts.

8. The process of claim 1 wherein the cyclicsiloxane is present at a concentration of 5 to 15 parts.

9. The process of claim 1 wherein the sil-nitrogen compound is present at a concentration of 7 to 15 parts.

10. A filler produced in accordance with the process of claim 1 having a surface area of at least 50 square meters per gram containing 4 percent to 20 percent by weight of chemically combined organosiloxy units of the formula $R_3^4\text{Si}-$ and 2 to 10 percent by weight of chemically combined diorganosiloxy units of the formula $R_2^3\text{Si}-$, wherein $R^3$ and $R^4$ are selected from the class consisting of hydrogen, monovalent hydrocarbon radicals and halogenated monovalent hydrocarbon radicals.

11. A process for treating a silica filler comprising (a) intimately contacting 100 parts of a silica filler having a surface area of at least 50 square meters per gram and containing 0.2 to 2.0 percent by weight of moieties selected from the class consisting of hydroxyl groups, water and mixtures thereof with (i) from one-half part to 5 parts of a hydroxyl amine having the formula,

$$R^1\text{—}\overset{R^2}{\underset{}{N}}\text{OH}$$

ii. from 2 to 25 parts of a cyclicsiloxane of the formula,

$(R_2^3 \text{SiO})$, and iii. from 1 to 20 parts of a sil-nitrogen compound of the formula,

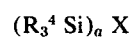

$(R_3^4 \text{Si})_a \text{X}$ wherein the above additives are simultaneously contacted with said filler at a temperature in the range of 100° to 180°C and (b) removing residual amounts of said additives from the filler where $R^1$ is selected from the class consisting of monovalent hydrocarbon radicals, and halogenated monovalent hydrocarbon radicals, $R^2$, $R^3$ and $R^4$ are all selected from the class consisting of hydrogen, monovalent hydrocarbon radicals and halogenated monovalent hydrocarbon radicals where at a maximum only 33 mole percent of the $R^3$ and $R^4$ radicals may be hydrogen, $a$ is a whole number that varies from 1 to 2, X is selected from the class consisting of $-NR^5Y$, $-ONR_2^5$ and

where $R^5$ is selected from monovalent hydrocarbon radicals and halogenated monovalent hydrocarbon radicals and Y is selected from hydrogen and $R^5$.

* * * * *